March 2, 1948.                J. M. ABEEL                2,436,985
GOPHER TRAP
Filed Feb. 19, 1946
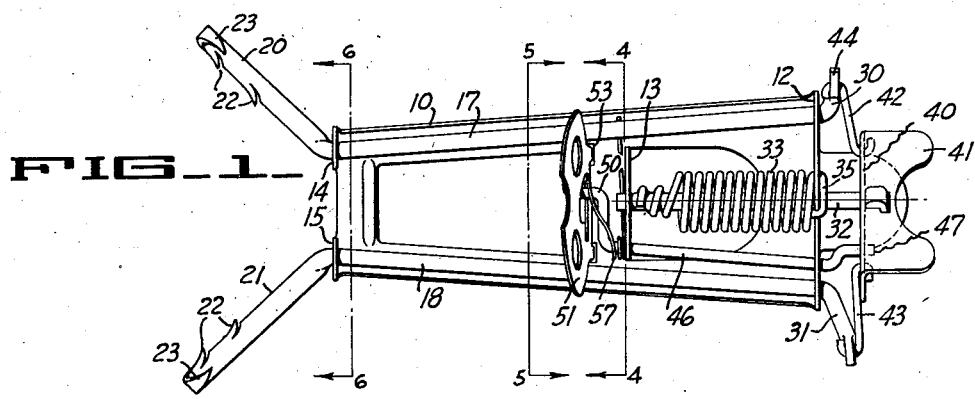
FIG_1_
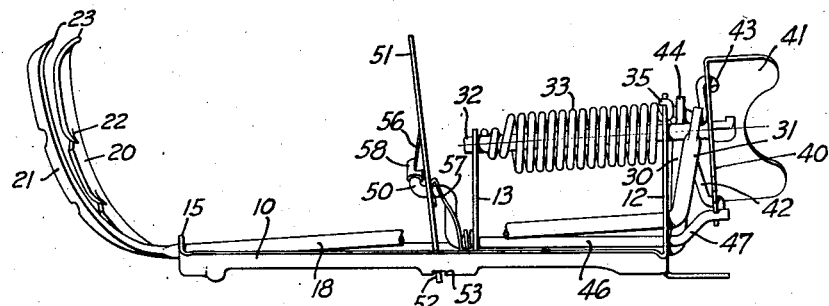
FIG_2_
FIG_5_    FIG_4_    FIG_3_
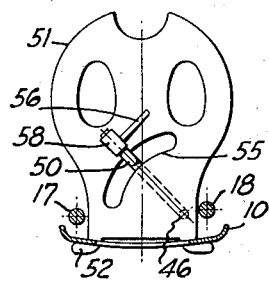 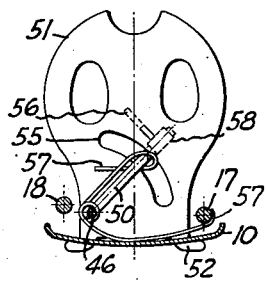 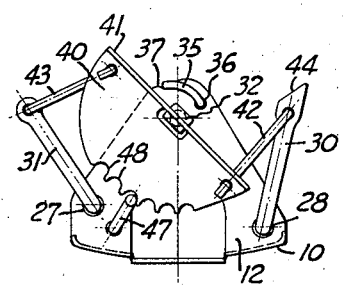
FIG_6_
INVENTOR.
James M. Abeel
BY
Paul D. Flehr
ATTORNEY Patented Mar. 2, 1948

2,436,985

UNITED STATES PATENT OFFICE 2,436,985

GOPHER TRAP

James M. Abeel, Sebastopol, Calif.

Application February 19, 1946, Serial No. 648,619

6 Claims. (Cl. 43—91)

This invention relates generally to animal traps designed particularly for catching animals such as gophers.

It is the general object of the invention to provide an animal trap of simple construction which sets itself automatically upon the application of spring tension to the impaling or jaw members of the trap.

It is a further object of this invention to provide an animal trap made in accordance with the disclosure of my Patent No. 1,791,651 but in which the trigger member is automatically engaged by the setting arm.

Further objects of the invention will appear from the following description when taken in conjunction with the accompanying drawing in which:

Figure 1 is a plan view of a trap constructed in accordance with my invention showing the impaling jaws in set position.

Figure 2 is a side elevational view of the trap as shown in Figure 1.

Figure 3 is an end view of the trap shown in Figures 1 and 2.

Figure 4 is a cross sectional detail taken along the line 4—4 of Figure 1.

Figure 5 is a cross sectional detail taken along the line 5—5 of Figure 1.

Figure 6 is a cross sectional view taken along the line 6—6 of Figure 1.

Referring to Figures 1 to 3 inclusive, my trap consists preferably of a base member 10 formed of sheet metal and provided with a pair of upstanding and substantially parallel vertical members 12 and 13 and a pair of upstanding tabs 14 and 15.

A pair of shafts 17 and 18 are journaled to base member 10 near the outer edges thereof and extend through member 12 and tab 14 and member 12 and tab 15 respectively. The extending ends of shafts 17 and 18 form impaling jaws 20 and 21 respectively, the jaws being curved inwardly toward each other so that their ends cross when the trap is in sprung position, not shown, and so that their ends are substantially spread, generally shown in Figure 6, when the trap is in set position. Suitable teeth or prongs 22 and 23 can be provided upon the jaws 20 and 21.

Upstanding tabs 14 and 15 serve as means for journaling shafts 17 and 18 to that portion of base 10 adjacent the jaws 20 and 21, in that shafts 17 and 18 extend through suitable orifices 25 and 26 in said tabs. Shafts 17 and 18 likewise extend through suitable orifices 27 and 28 in member 12 and are bent laterally to form lever arms 30 and 31 respectively. Likewise extending through member 12 and journaled within the same, is a shaft 32 about which is coiled a helical spring 33. The end of shaft 32 remote from member 12 extends through member 13 and is journaled within the same. One end of helical spring 33 is fixed with respect to plate 12 and base 10 and to effect this result I have shown one portion 35 thereof extending through an orifice 36 in plate 12 and bent back upon itself to rest in a notch 37. The other end of spring 33 is suitably secured to shaft 32 so that tension of the spring tends to rotate shaft 32 in one direction.

Fixed to that end of shaft 32 which extends beyond plate 12 there is a notched plate 40 having an integral handle portion 41 secured thereto for effecting rotation of the same against the torsional tension of spring 33. Plate 40 is connected to lever arms 30 and 31 by links 42 and 43 which are pivotally connected to plate 40.

Spring 33 normally tends to urge plate 40 in a clock-wise direction as viewed in Figure 3. Rotation in this direction is limited by abutment of the tapered end 44 of arm 30 against shaft 32.

To provide a trigger means for retaining the trap in the set position, shown in Figures 1, 2 and 3, I have provided a shaft 46 which extends through and is journaled in both upright members 12 and 13. On one end of shaft 46 there is provided an arm 47 which is adapted to engage the notches 48 on plate 40. The other end of shaft 46 is provided with an arm 50.

Extending upwardly from base 10 and pivotally secured thereto there is a trigger member 51 which is intended to be engaged by the animal for tripping the trap. To provide a pivotal connection for trigger 51, its lower edge is provided with tabs 52 which extend through apertures 53 in base 10.

Arm 50 extends through an arcuate slot 55 in trigger 51, slot 55 limiting the movement of the arm 50 in either direction and also limiting the fore and aft movement of trigger 51. A suitable shoulder 56 is provided upon one face of trigger member 51 and is adapted to engage arm 50.

A light spring 57 is wrapped around shaft 46, with one end engaging base 10 and terminating under shaft 17. The other end of the spring is suitably wrapped around the bent portion of arm 50 and also engages trigger 51. Spring 57 is so formed that it tends to urge arm 50 upwardly against shoulder 56 and to urge trigger 51 forwardly against the upturned portion of arm 50. Spring 57 also tends to urge arm 47 into a generally vertical position whereby it engages teeth 48 on plate 40. Since the end of spring 57 engages the lower side of shaft 17 it will be seen that spring 57 is, in reality, secured to the base 10 thereby preventing its rotation with respect to shaft 46 and insuring its proper operation regardless of the position of the trap.

Operation of my trap may be briefly described as follows:

The operator grasps portion 41 with one hand and with his other hand grasps base 10. The portion 41 is moved in a counter-clockwise direction against the tension of spring 33 thereby urging jaws 20 and 21 to the "set" position shown in Figure 1. The action of spring 57 tends to rotate shaft 46 in a counter-clockwise direction thereby urging arm 47 into engagement with the teeth 48 of plate 40, also urging arm 50 to assume a position against shoulder 56 and urging trigger 51 forwardly against arm 50. When the jaws have been separated the desired distance, the operator may release the finger hold portion 41 and place the trap in the desired hole or other location. Since arm 50 engages shoulder 56, shaft 46 and arm 47 cannot rotate in a counter-clockwise direction and plate 40 is prevented from rotating.

A slight pressure upon trigger member 51 will effect dis-engagement of shoulder 56 from arm 50 whereby arm 47 will be allowed to rotate in a counter-clockwise direction, as shown in Figure 3, and plate 40 will, under the tension of spring 33, rotate rapidly to the so-called sprung position and such action will be transmitted to jaws 20 and 21 through links 42 and 43 and arms 30 and 31 respectively.

Spring 57, by urging trigger 51 forwardly against the arm 50, sets the trap automatically and overcomes the prior difficulty which necessitated manual operation of trigger 51 to urge it and shoulder 56 against the arm 50.

Spring 57 likewise urges shaft 46, arm 47, and arm 50 in a counter-clockwise direction as viewed in Figure 3, whereby arm 50 is urged into engagement with shoulder 56 and arm 47 is urged into engagement with the proper notch 48 in plate 40.

In this manner the trap is automatically set upon simple rotation of portion 40 in a counter-clockwise direction as shown in Figure 3. It should, of course, be pointed out that spring 57 is not sufficiently strong to maintain trigger 51 in set position against any substantial pressure by an animal. It has been found that the spring 57 need only be of very light construction sufficient to overcome the weight of trigger 51. Slight activity by an animal will overcome the slight tension of spring 57 and allow the trigger 51 to be moved from the position shown in Figure 2 to a position in which arm 50 and shoulder 56 are disengaged. In order to facilitate the disengagement of shoulder 56 and arm 50 I have provided a collar 58 of non-corrodible material thereon which is adapted to fit loosely thereabout and rotate freely thereon. Collar 58 is preferably made of non-corrodible material such as brass, and in this manner the frictional engagement between arm 50 and shoulder 56 is reduced to a minimum and the free swinging of trigger 51 is restricted almost entirely by spring 57, even when the trap is in set position.

I claim:

1. In an animal trap having a base member, a pair of shafts journaled to said base member, impaling members carried by said shafts, a rotatable member operably connected to said shafts whereby upon rotation of said member in one direction said shafts are operated in opposite directions, a plurality of notches formed in said member, a rod journaled to said base, an arm secured to said rod and engageable in any one of said notches, a second arm secured to said rod, a trigger member adapted to engage said second arm, and a setting mechanism comprising spring means adapted to urge said first named arm into engagement with said notches and to urge said trigger forwardly against said second named arm whereby when said trap is being set the trigger is maintained in engagement with said second named arm and said first named arm is urged into engagement with said notches.

2. In an animal trap having a base member, a pair of shafts journaled to said base member, impaling members carried by said shafts, a rotatable member operably connected to said shafts whereby upon rotation of said member in one direction said shafts are operated in opposite directions, a plurality of notches formed in said member, a rod journaled to said base, an arm secured to said rod and engageable in any one of said notches, a second arm secured to said rod, a trigger member adapted to engage said second arm, and a setting mechanism comprising a single spring means adapted to urge said first named arm into engagement with said notches and to urge said trigger forwardly against said second named arm whereby when said trap is being set the trigger is maintained in engagement with said second named arm and said first named arm is urged into engagement with said notches.

3. In an animal trap having a base member, a pair of shafts journaled to said base member, impaling members carried by said shafts, a rotatable member operably connected to said shafts whereby upon rotation of said member in one direction said shafts are operated in opposite directions, a plurality of notches formed in said member, a rod journaled to said base, an arm secured to said rod and engageable in any one of said notches, a second arm secured to said rod, a trigger member, a shoulder on said trigger member adapted to engage said second arm and maintain said impaling members in set position, and a setting mechanism comprising a spring adapted to urge said first named arm into engagement with said notches, adapted to urge said trigger forwardly against said second named arm, and adapted to urge said second named arm into engagement with said shoulder, whereby when said trap is being set the trigger and shoulder are maintained in engagement with said second named arm.

4. In an animal trap having a base member, a pair of shafts journaled to said base member, impaling members carried by said shafts, a rotatable member operably connected to said shafts whereby upon rotation of said member in one direction said shafts are operated in opposite directions, a plurality of notches formed in said member, a rod journaled to said base, an arm secured to said rod and engageable to any one of said notches, a second arm secured to said rod, a trigger member, a shoulder on said trigger member adapted to engage said second arm and maintain said impaling members in set position, and a setting mechanism comprising a spring adapted to urge said first named arm into engagement with said notches, adapted to urge said trigger forwardly against said second named arm, and adapted to urge said second named arm into engagement with said shoulder, whereby when said trap is being set the trigger and shoulder are maintained in engagement with said second named arm, and said first named arm is urged into engagement with said notches.

5. In an animal trap having a base member, a pair of shafts journaled to said base member, impaling members carried by said shafts, a rotatable member operably connected to said shafts whereby upon rotation of said member in one direction said shafts are operated in opposite directions, a plurality of notches formed in said member, a rod journaled to said base, an arm secured to said rod and engageable in any one of said notches, a second arm secured to said rod, a trigger, an arcuate slot in said trigger through which said second named arm extends, a shoulder on said trigger adjacent said slot adapted to engage said second named arm when said trigger is urged to a forward position, a setting mechanism comprising a spring adapted to urge said trigger to a forward position, adapted to urge said first named arm into engagement with said notches and adapted to urge said arm into engagement with said shoulder, whereby said second named arm is prevented from moving beyond said shoulder and whereby said first named arm is urged into engagement with said notches to prevent the rotation of said rotatable member.

6. In an animal trap having a base member, a pair of shafts journaled to said base member, impaling members carried by said shafts and extending laterally therefrom, a helical spring adapted to be placed under torsional tension, a rotatable member operably connected to said shafts and said spring, whereby said shafts are normally urged to rotate in opposite directions, a plurality of notches formed in said rotatable member, a rod journaled to said base, an arm secured to said rod and adapted to engage any one of said notches in said rotatable member, a second arm secured to said rod and adapted to pass through an arcuate slot in a trigger member likewise journaled to said base, and a setting mechanism comprising a single spring adapted to urge said first named arm into engagement with said notches, and also adapted to urge said trigger forwardly against said second named arm whereby when the trap is being set the trigger is maintained in engagement with said second named arm and said first named arm is urged into engagement with said notches.

JAMES M. ABEEL.